US011142197B2

(12) United States Patent
Kato et al.

(10) Patent No.: US 11,142,197 B2
(45) Date of Patent: Oct. 12, 2021

(54) VEHICLE CONTROL DEVICE

(71) Applicant: HONDA MOTOR CO., LTD., Tokyo (JP)

(72) Inventors: Daichi Kato, Wako (JP); Hiroshi Oguro, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 302 days.

(21) Appl. No.: 16/342,776

(22) PCT Filed: Oct. 18, 2016

(86) PCT No.: PCT/JP2016/080784
§ 371 (c)(1),
(2) Date: Apr. 17, 2019

(87) PCT Pub. No.: WO2018/073886
PCT Pub. Date: Apr. 26, 2018

(65) Prior Publication Data
US 2020/0047753 A1 Feb. 13, 2020

(51) Int. Cl.
B60W 30/12 (2020.01)
B60W 10/18 (2012.01)
(Continued)

(52) U.S. Cl.
CPC .......... B60W 30/12 (2013.01); B60W 10/18 (2013.01); B60W 10/20 (2013.01); G01C 21/3602 (2013.01); B60W 2554/00 (2020.02)

(58) Field of Classification Search
CPC ...... B60W 10/18; B60W 10/20; B60W 30/10; B60W 30/12; B60W 60/00; B60W 60/001;
(Continued)

(56) References Cited

U.S. PATENT DOCUMENTS 6,526,352 B1* 2/2003 Breed .................... G01S 19/14
701/470
9,623,874 B2* 4/2017 Baek ..................... B60W 40/09
(Continued)

FOREIGN PATENT DOCUMENTS

JP 2008-129804 A 6/2008
JP 2010-198578 A 9/2010
(Continued)

OTHER PUBLICATIONS

PCT/ISA/210 from International application PCT/JP2016/080784 and the English translation thereof.

Primary Examiner — Angelina Shudy
(74) Attorney, Agent, or Firm — Carrier Blackman & Associates, P.C.; Joseph P. Carrier; Jeffrey T. Gedeon

(57) ABSTRACT

In this vehicle control device, a low-level short-term trajectory generating unit generates a short-term trajectory by using the newest dynamic external environment recognition information while also using the same static external environment recognition information (lane shape information, or the like) as the static external environment recognition information used by a high-level medium-term trajectory generating unit. Performing such control prevents inconsistency between the external environment information (environmental information) used by the low-level short-term trajectory generating unit and that used for a medium-term trajectory, which is a high-level trajectory, and makes stable trajectory output possible.

6 Claims, 9 Drawing Sheets

(51) Int. Cl.
 *B60W 10/20* (2006.01)
 *G01C 21/36* (2006.01)
(58) Field of Classification Search
 CPC .......... B60W 60/0011; B60W 2554/00; G01C 21/36; G01C 21/3602
 See application file for complete search history.

(56) References Cited

U.S. PATENT DOCUMENTS

| | | | | |
|---|---|---|---|---|
| 10,203,211 | B1* | 2/2019 | Mishra | G01C 21/3415 |
| 10,809,719 | B2* | 10/2020 | Binet | G05D 1/0061 |
| 11,054,833 | B2* | 7/2021 | Kato | G05D 1/0219 |
| 2004/0193349 | A1* | 9/2004 | Flann | A01B 69/008 |
| | | | | 701/50 |
| 2008/0046150 | A1* | 2/2008 | Breed | B60R 21/0134 |
| | | | | 701/45 |
| 2010/0042282 | A1 | 2/2010 | Taguchi et al. | |
| 2012/0022716 | A1* | 1/2012 | Kitahama | G08G 1/166 |
| | | | | 701/1 |
| 2013/0110343 | A1* | 5/2013 | Ichikawa | G01C 21/3415 |
| | | | | 701/23 |
| 2015/0032290 | A1* | 1/2015 | Kitahama | G08G 1/16 |
| | | | | 701/1 |
| 2015/0106001 | A1* | 4/2015 | Lee | G01C 21/36 |
| | | | | 701/123 |
| 2016/0297478 | A1* | 10/2016 | Inoue | B60W 40/08 |
| 2017/0160091 | A1* | 6/2017 | Hwang | G01C 21/362 |
| 2017/0277192 | A1* | 9/2017 | Gupta | B60W 30/20 |
| 2017/0329338 | A1* | 11/2017 | Wei | G05D 1/0212 |
| 2018/0099666 | A1* | 4/2018 | Abe | B60W 40/072 |
| 2018/0203454 | A1* | 7/2018 | Aoki | B60W 50/0097 |
| 2018/0203455 | A1* | 7/2018 | Cronin | G01C 21/3492 |
| 2018/0208199 | A1* | 7/2018 | Fujita | G05D 1/0088 |
| 2018/0218600 | A1* | 8/2018 | Fujita | G08G 1/096827 |
| 2018/0253424 | A1* | 9/2018 | Banerjee | H04W 4/02 |
| 2018/0253621 | A1* | 9/2018 | Banerjee | G06K 9/4642 |
| 2018/0348767 | A1* | 12/2018 | Tafti | G08G 1/163 |
| 2019/0064813 | A1* | 2/2019 | Binet | G05D 1/0088 |
| 2019/0084561 | A1* | 3/2019 | Takeda | B60W 30/14 |
| 2019/0138007 | A1* | 5/2019 | Baghsorkhi | G08G 1/091 |
| 2019/0359202 | A1* | 11/2019 | Zhu | B60W 10/20 |
| 2020/0047753 | A1* | 2/2020 | Kato | B60W 30/12 |
| 2020/0056897 | A1* | 2/2020 | Williamson | G01C 21/3415 |
| 2020/0057447 | A1* | 2/2020 | Kato | B60W 40/02 |
| 2020/0184849 | A1* | 6/2020 | Spence | B60W 30/18145 |
| 2020/0189573 | A1* | 6/2020 | King | B60W 60/0011 |
| 2020/0387156 | A1* | 12/2020 | Xu | B60W 10/18 |
| 2021/0058173 | A1* | 2/2021 | Otaki | H04B 17/364 |
| 2021/0109521 | A1* | 4/2021 | Hammond | G01C 21/3407 |

FOREIGN PATENT DOCUMENTS

| | | |
|---|---|---|
| JP | 2010-205228 A | 9/2010 |
| JP | 5306934 B2 | 10/2013 |

* cited by examiner

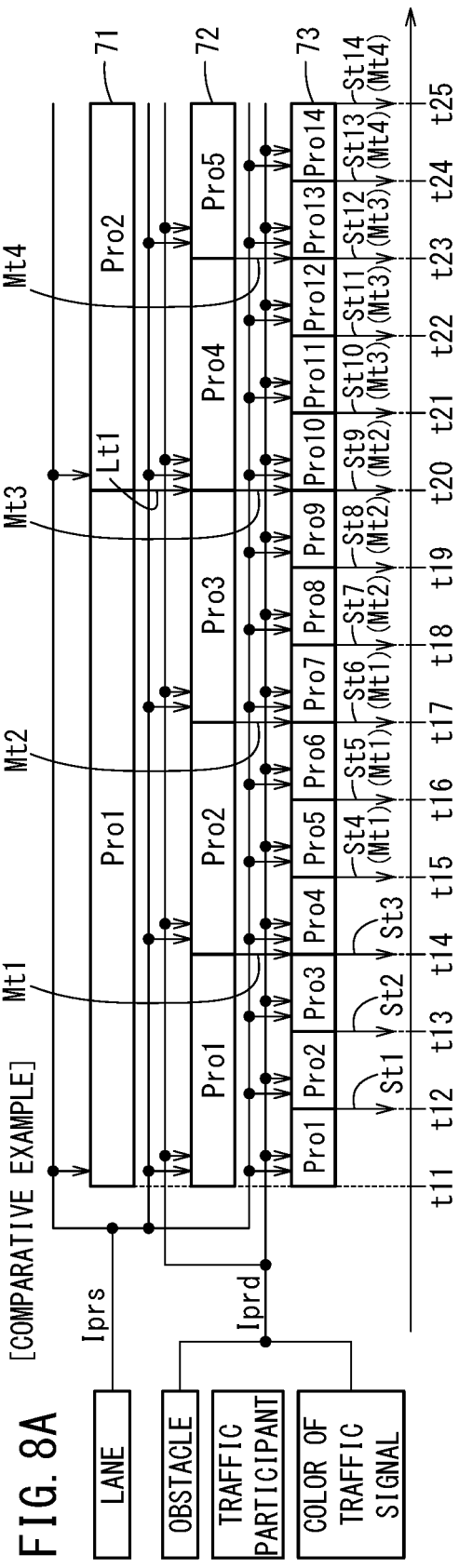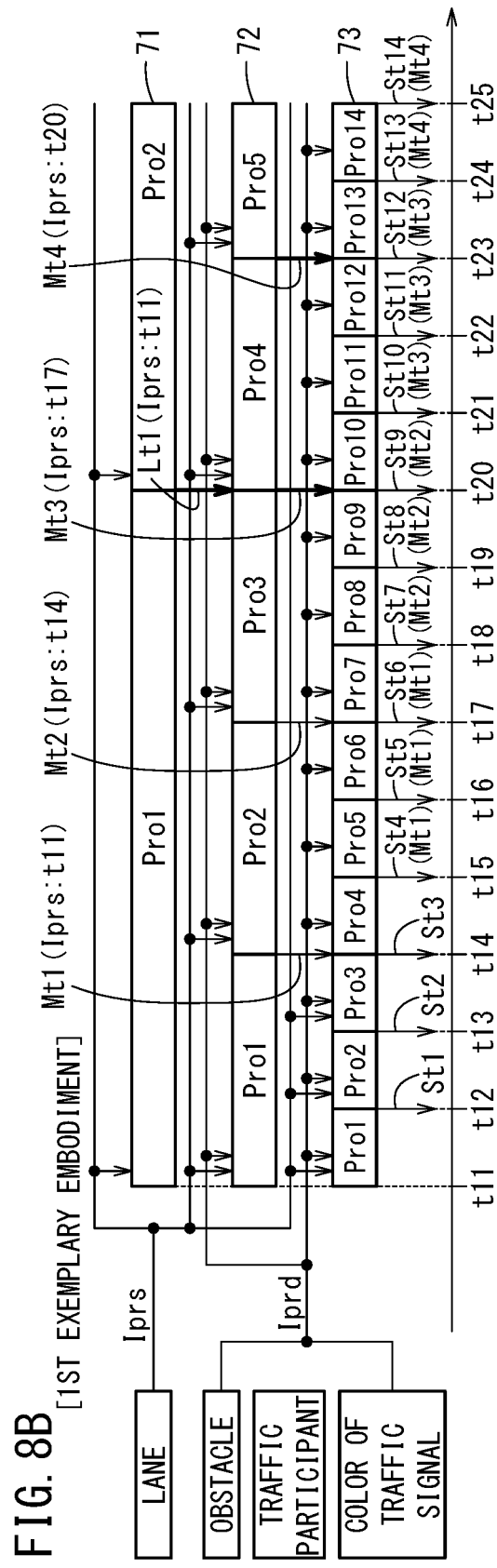

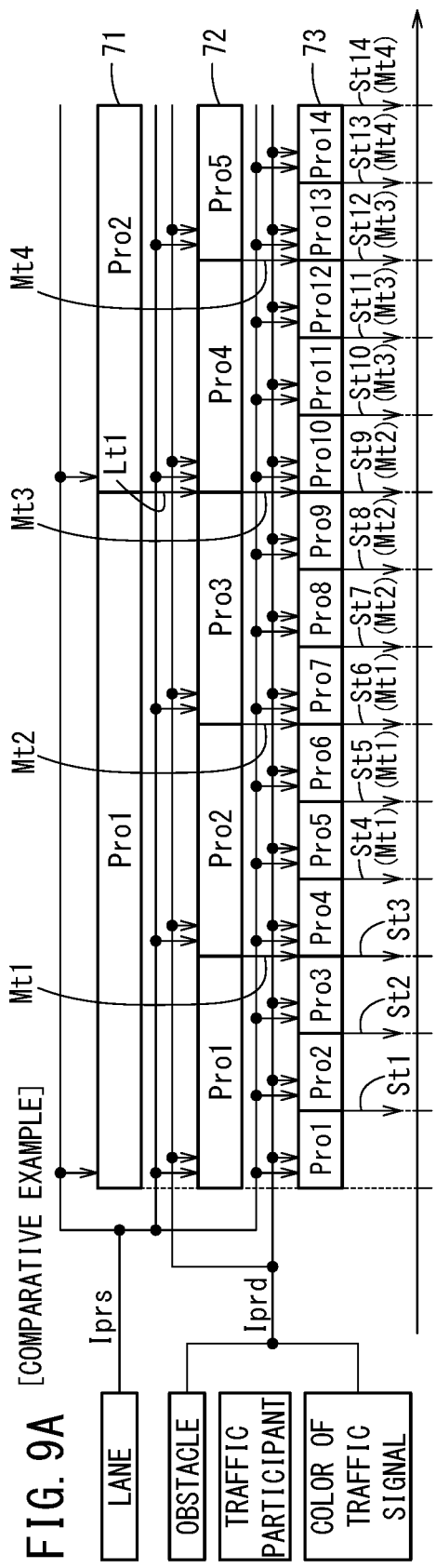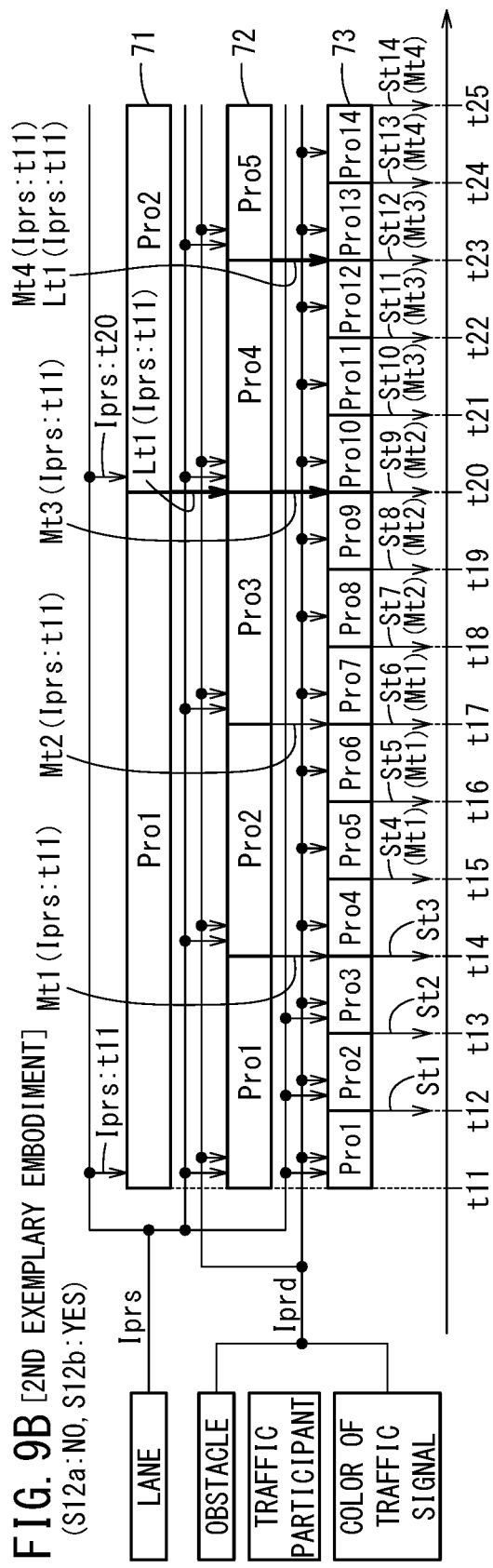

VEHICLE CONTROL DEVICE

TECHNICAL FIELD

The present invention relates to a vehicle control device suitable for being applied to a vehicle that is capable of being driven automatically (including an automated driving assist).

BACKGROUND ART

In Japanese Patent No. 5306934 (hereinafter referred to as JP5306934B), a control system is disclosed which, in order to generate a plurality of action objectives, is equipped with a plurality of modules (referred to as action objective generation modules) which are hierarchized in accordance with a length of operation cycles thereof, and wherein a control object is controlled through a control module in accordance with calculation results of the plurality of action objective generation modules. A specific control object that is controlled by such a control system is a leg type robot.

JP5306934B includes the action objective generation modules which are divided into three layers in accordance with the operation cycle, and the action objective generation module having the longest operation cycle is placed in charge of moving the robot to the target position, the action objective generation module having an intermediate operation cycle is placed in charge of causing the robot to avoid contact with objects, and the action objective generation module having a short operation cycle is placed in charge of stabilizing the posture of the robot.

In such a hierarchical control system, a configuration is provided in which behaviors of the control object are controlled in a manner so that evaluation results produced by an action objection generation module having a shorter operation cycle are preferentially reflected more so than the evaluation results produced by an action objective generation module having a longer operation cycle (see claim 1 of JP5306934B).

SUMMARY OF INVENTION

Incidentally, in a vehicle capable of being driven automatically (including an automated driving assist), it is a matter of course that the vehicle is made to reach a target position by traveling on a road while satisfying conditions of adaptability and responsiveness with respect to the recognized travel environment in the immediate vicinity, and emphasis is placed on the comfortableness and riding comfort of the vehicle occupants, for example, the smoothness of changes in behavior of the vehicle, which is similar to that of an exemplary driver.

However, according to JP5306934B, as a result of being concerned with a legged robot or the like, since a configuration is provided in which the behaviors of the legged robot are controlled momentarily from time to time in a manner in which the evaluation results by an action objection generation module having a shorter operation cycle are reflected in a preferential manner, and the robot is made to reach the target position, there is room for improvement in relation to enhancing the smoothness of changes in behavior of the control object (riding comfort of occupants).

The present invention has been devised taking into consideration the aforementioned problem, and has the object of providing a vehicle control device that can be appropriately applied to a trajectory generation process of an automatically driven vehicle (including a vehicle in which an automated driving assist is implemented), and which is capable of obtaining a stabilized trajectory output.

A vehicle control device according to the present invention is a vehicle control device that controls a vehicle configured to be driven automatically, comprising an external environment recognition unit configured to recognize a lane shape of a lane in which at least a host vehicle travels, from external environmental information that is detected by an external environment sensor configured to detect the external environmental information, and to generate external environment recognition information including lane shape information of the recognized lane shape, a first trajectory generating unit configured to generate, using the external environment recognition information, a first trajectory in a first operation cycle, and a second trajectory generating unit configured to generate, using the external environment recognition information, a second trajectory that is longer than the first trajectory in a second operation cycle that is longer than the first operation cycle, and an integrated control unit configured to control the first trajectory generating unit and the second trajectory generating unit. In this instance, the external environment recognition unit is configured to perform the recognition process in a period that is less than or equal to that of the first operation cycle, and in a case that the external environment recognition information that is used by the second trajectory generating unit exists, the integrated control unit is configured to cause the first trajectory generating unit to refer to the external environment recognition information and the second trajectory, and to generate the first trajectory.

In this manner, according to the present invention, in the case that the first trajectory generating unit, which is of a lower hierarchical order, performs trajectory optimization using the most recent external environment recognition information and the second trajectory generated by the second trajectory generating unit, which is of a higher hierarchical order, in practice, even if the external environmental information (environmental information) has not changed, due to a recognition error of the external environment recognition unit, external environmental information that differs from the external environmental information used by the higher order second trajectory generating unit ends up being used. In that case, the second trajectory does not become an optimal solution with respect to the most recent external environmental information, an unnecessary multi-modality is generated in the evaluation function for evaluating the first trajectory, and there is a possibility that the output trajectory (first trajectory) may become unstable.

In actuality, although such a recognition error (recognition noise) applies to a lane shape that is made up from white lines, stop lines, or the like, such an error is intrinsically static (without change or movement), and by the lower order first trajectory generating unit using the external environment recognition information, a portion of which (the lane shape information) is the same as the external environmental information used by the higher order second trajectory generating unit, it is possible to suppress any inconsistency between the external environmental information (environmental information) and the second trajectory, which is the higher order trajectory referred to by the lower order first trajectory generating unit.

In this case, the external environment recognition information, in addition to static external environment recognition information including the lane shape information, includes travel restraint source information, which is dynamic external environment recognition information including the travel restraint source information including a traffic participant that restrains traveling of the host vehicle, and when the first trajectory generating unit generates a trajectory, the integrated control unit is configured to cause the first trajectory generating unit to use for the dynamic external environment recognition information most recent external environment recognition information.

According to the present invention, when the first trajectory generating unit generates the first trajectory which is shorter than the second trajectory in the first operation cycle that is shorter than the second operation cycle of the second trajectory generating unit, since the dynamic external environment recognition information that includes the traffic participant is generated using the most recent external environment recognition information that is recognized within the period of the first operation cycle or less, it is possible to generate the first trajectory in which the responsiveness of the vehicle with respect to traffic participants or the like is not reduced.

In this case, the external environment recognition information may include, in addition to the lane shape information, sign and marking information which is static external environment recognition information that regulates traveling of the host vehicle, and the integrated control unit may be configured to cause the second trajectory generating unit to use the sign and marking information, together with causing the first trajectory generating unit to use the sign and marking information that is used by the second trajectory generating unit.

For example, because the first trajectory generating unit is made to use the sign and marking information that is used by the second trajectory generating unit and which regulates traveling, such as signs indicating a maximum speed or stop lines or the like, the second trajectory generated by the second trajectory generating unit, in which a smooth transition or stopping of the speed of the vehicle is preformed, can be used by the first trajectory generating unit.

Further, the vehicle control device may further comprise a third trajectory generating unit controlled by the integrated control unit, and configured to generate a third trajectory that is longer than the second trajectory, using the external environment recognition information in a third operation cycle that is longer than the second operation cycle, wherein the integrated control unit, when automated driving is started, may be configured to cause the first trajectory generating unit, the second trajectory generating unit, and the third trajectory generating unit to simultaneously start generation of each of respective trajectories, before the second trajectory is generated, cause the first trajectory generating unit to generate the first trajectory using the most recent external environment recognition information, when the second trajectory is generated, cause the first trajectory generating unit to generate the first trajectory using the external environment recognition information including the second trajectory and the lane shape that is used by the second trajectory generating unit, and when the third trajectory is generated, cause the first trajectory generating unit to generate the first trajectory using the external environment recognition information including the third trajectory and the lane shape information that is used by the third trajectory generating unit.

According to the present invention, when automated driving is placed in an ON state, by way of the first trajectory generating unit, the second trajectory generating unit, and the third trajectory generating unit, at first, the vehicle is controlled with a first trajectory that was generated by the first trajectory generating unit having the shortest operation cycle, next, the vehicle is controlled with the first trajectory made with reference to a second trajectory that was generated by the second trajectory generating unit having a medium operation cycle, and next, the second trajectory is generated with reference to a third trajectory that was generated by the third trajectory generating unit having the longest operation cycle, and furthermore, the first trajectory is generated with reference to the second trajectory that was generated with reference to the third trajectory, and the vehicle is controlled by the generated first trajectory.

For this reason, when automated driving is placed in the ON state, automated driving can be started immediately, and a transition can gradually be made in a stepwise manner to automated driving in which riding comfort and comfortability are taken into consideration. In this case, it is possible to suppress any inconsistency between the external environmental information (environmental information) and the higher order trajectory referred to by the lower order trajectory generating unit, and to perform trajectory output in a stabilized manner.

In this instance, the external environment recognition information, in addition to the lane shape information, or the lane shape information and the sign and marking information, may include travel restraint source information that restrains traveling of the host vehicle, and the integrated control unit may be configured to cause the first and second trajectory generating units to use the travel restraint source information without it being used by the third trajectory generating unit.

According to the present invention, riding comfort (smoothness of changes in the behavior of the vehicle) is emphasized in the third trajectory which is a relatively long-term trajectory, whereas adaptability and responsiveness to the recognized external environment are emphasized in the second trajectory which is a medium-term trajectory and the first trajectory which is a short-term trajectory. Therefore, when the first trajectory and the second trajectory are generated, by using the travel restraint source information that restrains traveling of the host vehicle, while adaptability and responsiveness to the external environment are maintained, and by controlling the vehicle by the first trajectory while indirectly using the third trajectory that was generated using the lane shape, automated driving can be performed in which riding comfort (comfortableness) is taken into consideration.

Furthermore, the lane shape information may be information recognized from a lane regulating object provided on a road surface, and the travel restraint source information may be information including an obstacle, a traffic participant, or a color of a traffic signal.

According to the present invention, the third trajectory generating unit is capable of generating a trajectory in which emphasis is placed on riding comfort, on the basis of information recognized from a lane regulating object provided on the road surface, and the first trajectory generating unit and the second trajectory generating unit are capable of generating trajectories in which emphasis is placed on adaptability and responsiveness, on the basis of information including an obstacle, a traffic participant, or the color of a traffic signal.

Further still, the lane regulating object may include a lane marking or a lane departure prevention member.

According to the present invention, the external environment recognition unit is capable of recognizing the lane shape of the lane in which the host vehicle travels from the lane markings, or the lane departure prevention member such as a curbside, a guardrail, or the like.

BRIEF DESCRIPTION OF DRAWINGS

FIG. 8A is a time chart of a comparative example;

FIG. 8B is a time chart according to an embodiment (first exemplary embodiment) in which the time chart of FIG. 6 is drawn in a deformed manner;

FIG. 9A is a time chart of the same comparative example as FIG. 8A; and

FIG. 9B is a time chart according to an embodiment (second exemplary embodiment) in which the time chart of FIG. 6 is drawn in a deformed manner.

DESCRIPTION OF EMBODIMENTS

A preferred embodiment of a vehicle control device according to the present invention will be presented and described below with reference to the accompanying drawings, in relation to a vehicle in which the vehicle control device is installed.

[Configuration of Vehicle 10]

Figure 1:
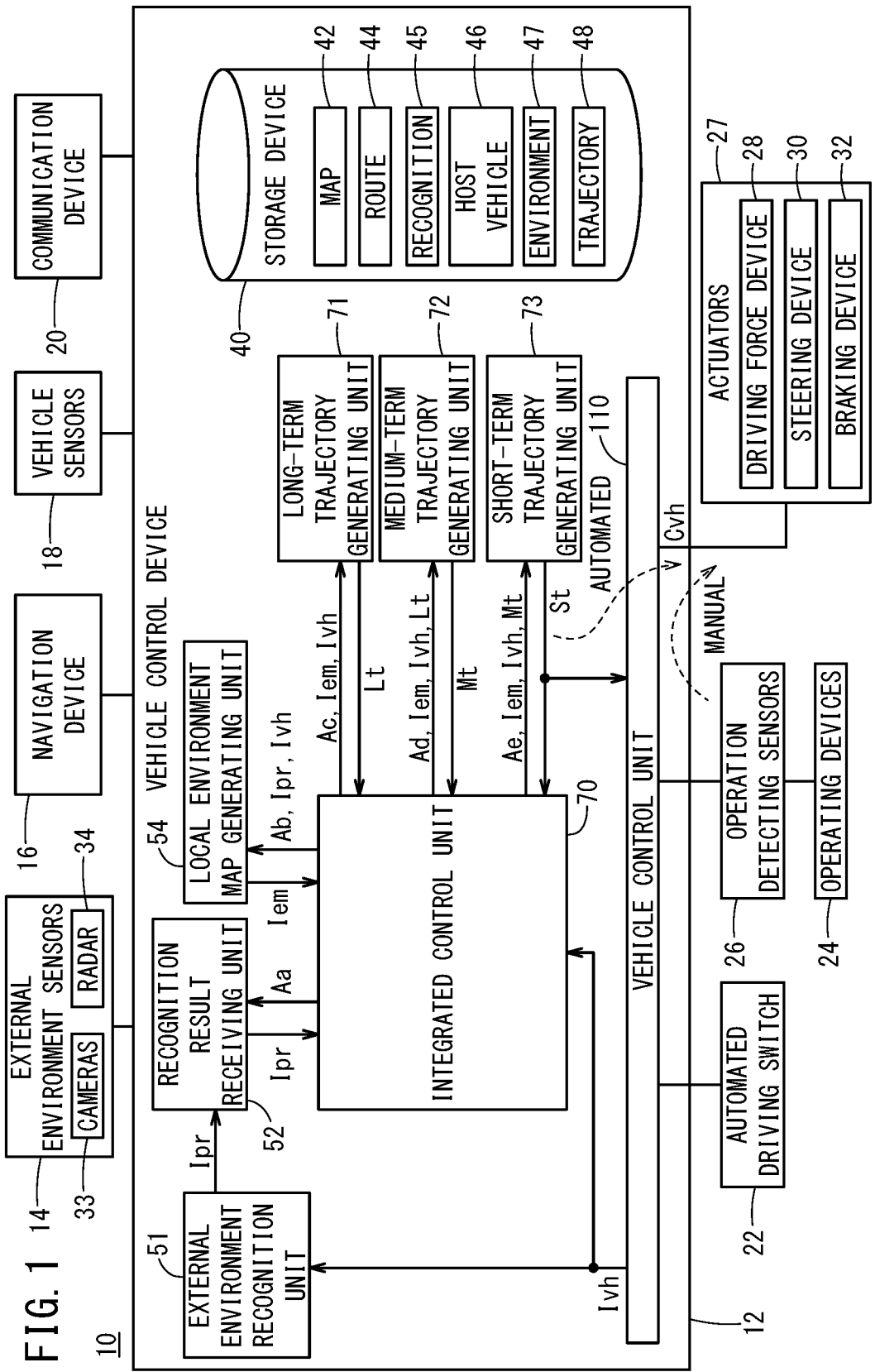
FIG. 1 is a schematic configuration block diagram of a vehicle equipped with a vehicle control device according to a present embodiment.

FIG. 1 is a schematic configuration block diagram of a vehicle 10 (also referred to as a "host vehicle" or a "driver's own vehicle") equipped with a vehicle control device 12 according to a present embodiment.

The vehicle 10 includes the vehicle control device 12, and in addition to the vehicle control device 12, is equipped with input devices and output devices which are connected via communication lines to the vehicle control device 12.

As the input devices, there are provided external environment sensors 14, a navigation device 16, vehicle sensors 18, a communication device 20, an automated driving switch (automated driving SW) 22, and operation detecting sensors 26 connected to operating devices 24.

As the output devices, there are provided actuators 27 including a driving force device 28 for driving the vehicle wheels (not shown), a steering device 30 for steering the vehicle wheels, and a braking device 32 for braking the vehicle wheels.

Moreover, the navigation device 16 and the communication device 20 can also be used as input/output devices (human interface, transceiver).

[Configuration of Input/Output Devices Connected to Vehicle Control Device 12]

The external environment sensors 14 include a plurality of cameras 33 and a plurality of radar devices 34 which acquire information indicative of the external environment (360° around the front, rear, and sides, etc.) of the vehicle 10, and output the acquired external environmental information of the vehicle 10 to the vehicle control device 12. The external environment sensors 14 may further be equipped with a plurality of LIDAR (Light Detection and Ranging; Laser Imaging Detection and Ranging) devices.

The navigation device 16 detects and specifies a current position of the vehicle 10 using a satellite positioning device or the like, together with including a touch panel display, a speaker, and a microphone as a user interface, and further, calculates a route to a designated destination from the current position or a position designated by the user, and outputs the calculated route to the vehicle control device 12. The route calculated by the navigation device 16 is stored as route information in a route information storage unit 44 of a storage device 40.

The vehicle sensors 18 output to the vehicle control device 12 detection signals from respective sensors, including a speed (vehicle speed) sensor for detecting the speed (vehicle speed), an acceleration sensor for detecting an acceleration, and a lateral G sensor for detecting a lateral G force of the vehicle 10, a yaw rate sensor for detecting an angular velocity about a vertical axis of the vehicle 10, an orientation sensor for detecting an orientation of the vehicle 10, and a gradient sensor for detecting a gradient of the vehicle 10. At each of respective operation cycles Toc, to be described later, the detection signals are stored as host vehicle state information Ivh of the host vehicle in a host vehicle state information storage unit 46 of the storage device 40.

The communication device 20 communicates with roadside devices, other vehicles, and a server, etc., and receives or transmits information related to traffic signals, etc., information related to the other vehicles, as well as probe information and updated map information or the like. In addition to being stored in the navigation device 16, the map information is stored as map information in a map information storage unit 42 of the storage device 40.

The operating devices 24 include an accelerator pedal, a steering wheel (handle), a brake pedal, a shift lever, and a direction indicating (turn signal) lever, and the like. The operation detecting sensors 26, which detect the presence or absence or the operated amounts of operations made by the driver, as well as operated positions, are attached to the operating devices 24.

The operation detecting sensors 26 output to a vehicle control unit 110 as detection results an amount by which the accelerator is depressed (degree of accelerator opening), an amount (steering amount) at which the steering wheel is operated, an amount by which the brake pedal is depressed, a shift position, and a right or left turn direction, etc.

The automated driving switch 22, for example, is a pushbutton switch provided on the instrument panel, and is operated manually by a user such as a driver or the like in order to switch between a non-automated driving mode (manual driving mode) and an automated driving mode.

The automated driving mode is a driving mode in which the vehicle 10 travels under the control of the vehicle control device 12, in a state in which the driver does not operate the operating devices 24 such as the accelerator pedal, the steering wheel, and the brake pedal, and is a driving mode in which the vehicle control device 12 controls a portion or all of the driving force device 28, the steering device 30, and the braking device 32 on the basis of action plans (a short-term trajectory St, a medium-term trajectory Mt, and a long-term trajectory Lt, to be described later).

Moreover, during the automated driving mode, in the case that the driver starts to operate any of the operating devices 24 such as the accelerator pedal, the steering wheel, or the brake pedal, the automated driving mode is canceled automatically, and the system switches over to the non-automated driving mode (manual driving mode).

In this instance, even in the manual driving mode, certain driving assist functions, such as a known adaptive cruise control (ACC) function, and a lane keeping assist system (LKAS) function can be implemented.

Further, the aforementioned automated driving switch 22 may be of a touch type, a voice input type, or the like.

The driving force device 28 is constituted from a driving force ECU, and a drive source for the vehicle 10 such as an engine and/or a traction motor or the like. The driving force device 28 generates a travel driving force (torque) in order for the vehicle 10 to travel in accordance with vehicle control values Cvh input thereto from the vehicle control unit 110, and transmits the travel driving force to the vehicle wheels directly or through a transmission.

The steering device 30 is constituted from an EPS (electric power steering system) ECU, and an EPS device. The steering device 30 changes the orientation of the vehicle wheels (steered wheels) in accordance with the vehicle control values Cvh input thereto from the vehicle control unit 110.

The braking device 32, for example, is an electric servo brake used in combination with a hydraulic brake, and is made up from a brake ECU and a brake actuator.

The braking device 32 brakes the vehicle wheels in accordance with vehicle control values Cvh input thereto from the vehicle control unit 110.

Moreover, steering of the vehicle 10 can also be performed by changing a torque distribution and/or a braking force distribution with respect to the left and right vehicle wheels.

[Configuration of Vehicle Control Device 12]

The vehicle control device 12 is constituted by one or a plurality of ECUs (electronic control units), and is equipped with the storage device 40, etc., in addition to various function realizing units. According to the present embodiment, the function realizing units are software-based functional units, in which the functions thereof are realized by a CPU (central processing unit) executing programs stored in the storage device 40. However, the functions thereof can also be realized by hardware-based functional units made up from integrated circuits or the like.

Figure 2:
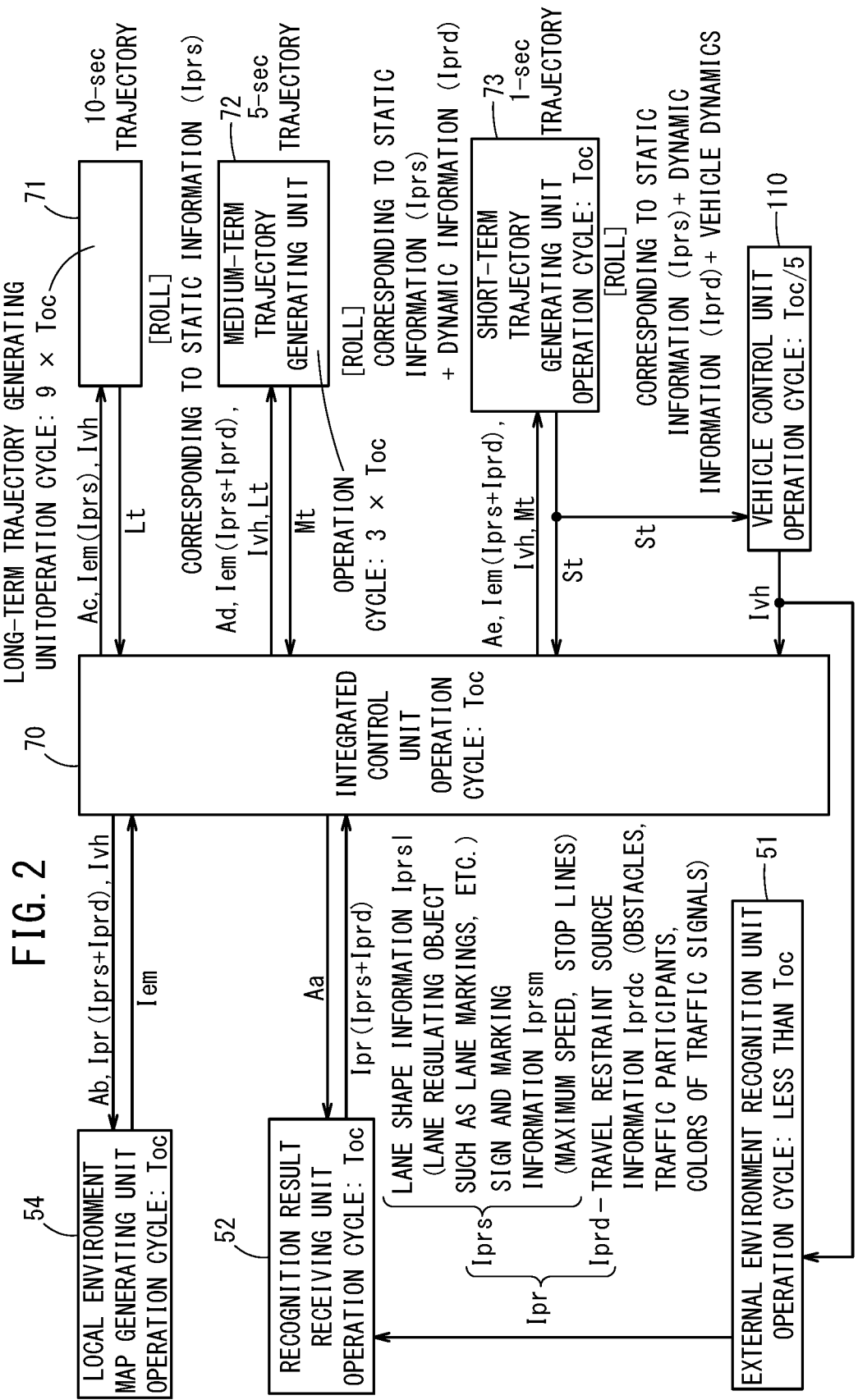
FIG. 2 is a block diagram in which the configuration of principle components appearing in FIG. 1 is extracted.

FIG. 2 is a block diagram extracted from FIG. 1 and showing the configuration of principle components of the vehicle control device 12 according to the present embodiment.

In addition to the storage device 40 (see FIG. 1) and the vehicle control unit 110 as a function realizing unit (function realizing module), the vehicle control device 12 includes an external environment recognition unit 51, a recognition result receiving unit 52, a local environment map generating unit (also referred to as an environment map generating unit) 54, a long-term trajectory generating unit 71, a medium-term trajectory generating unit 72, a short-term trajectory generating unit 73, and an integrated control unit (task synchronization module) 70 that controls these units comprehensively together with controlling task synchronization.

In the vehicle control device 12, the external environment recognition unit 51 simultaneously generates external environment recognition information Ipr made up from static (having no change or no movement) external environment recognition information Iprs, and dynamic (in which change or movement there of is possible) external environment recognition information Iprd.

When the static external environment recognition information Iprs is generated, the external environment recognition unit 51 refers to the host vehicle state information Ivh from the vehicle control unit 110, and furthermore, from among the external environment sensors 14, on the basis of the external environmental information (image information) from the cameras 33 and the like, recognizes lane markings (white lines) on both sides of the vehicle 10, together with recognizing the distances to stop lines of intersections or the like (how many meters there are up to the stop lines) as well as recognizing travel capable regions (planar regions in which guardrails and curbsides are excluded without concern to the lane markings), and then generates the static external environment recognition information Iprs, and transmits (outputs) such information to the recognition result receiving unit 52.

The static external environment recognition information Iprs includes lane shape information Iprsl which indicates the shape of a lane (a straight lane, a curved lane, a sloping lane, and the like) which is regulated by lane regulating objects such as lane markings, curbsides, guardrails, or the like, and sign and marking information Iprsm including signs (signs that prohibit exceeding a maximum speed, and the like) and markings (stop line markings, course change prohibition markings, and the like) included in the external environmental information (image information) and which regulate traveling of the host vehicle 10. Moreover, the curbsides and the guardrails function as lane departure prevention members.

When the dynamic external environment recognition information Iprd is generated, the external environment recognition unit refers to the host vehicle state information Ivh, and furthermore, on the basis of the external environmental information from the cameras 33 or the like, the external environment recognition unit 51 recognizes obstacles (including fallen objects, parked or stopped vehicles, animals), traffic participants (people, other vehicles including motorcycles), and travel restraint source information Iprdc such as the colors of traffic signals (blue (green), yellow (orange), red) and the like, and then generates the external environment recognition information Iprd, and transmits (outputs) such information to the recognition result receiving unit 52.

The external environment recognition unit 51 recognizes the external environment recognition information Ipr (Ipr=Iprs+Iprd) in a time period that is less than the operation cycle Toc, and transmits (outputs) such information to the recognition result receiving unit 52.

In this case, in response to an operation command Aa from the integrated control unit 70, the recognition result receiving unit 52 outputs the external environment recognition information Ipr (Ipr=Iprs+Iprd) received from the external environment recognition unit 51 to the integrated control unit 70 within the operation cycle Toc.

The integrated control unit 70 stores the external environment recognition information Ipr (Ipr=Iprs+Iprd) in the storage device 40.

In this instance, the operation cycle (also referred to as a reference cycle or a reference operation cycle) Toc is a standard operation cycle in the vehicle control device 12, and is set, for example, to a value on the order of several tens of ms.

In response to an operation command Ab from the integrated control unit 70, the local environment map generating unit 54 refers to (aggregates) the host vehicle state information Ivh as well as the external environment recognition information Ipr, and within the operation cycle Toc, generates environment map information (also referred to as local environment map information) Iem, and outputs such information to the integrated control unit 70.

The environment map information Iem, in general, is information obtained by synthesizing the host vehicle state information Ivh with the external environment recognition information Ipr. The environment map information Iem is stored in an environment map information storage unit (also referred to as a local environment map information storage unit) 47 of the storage device 40.

Figure 3:
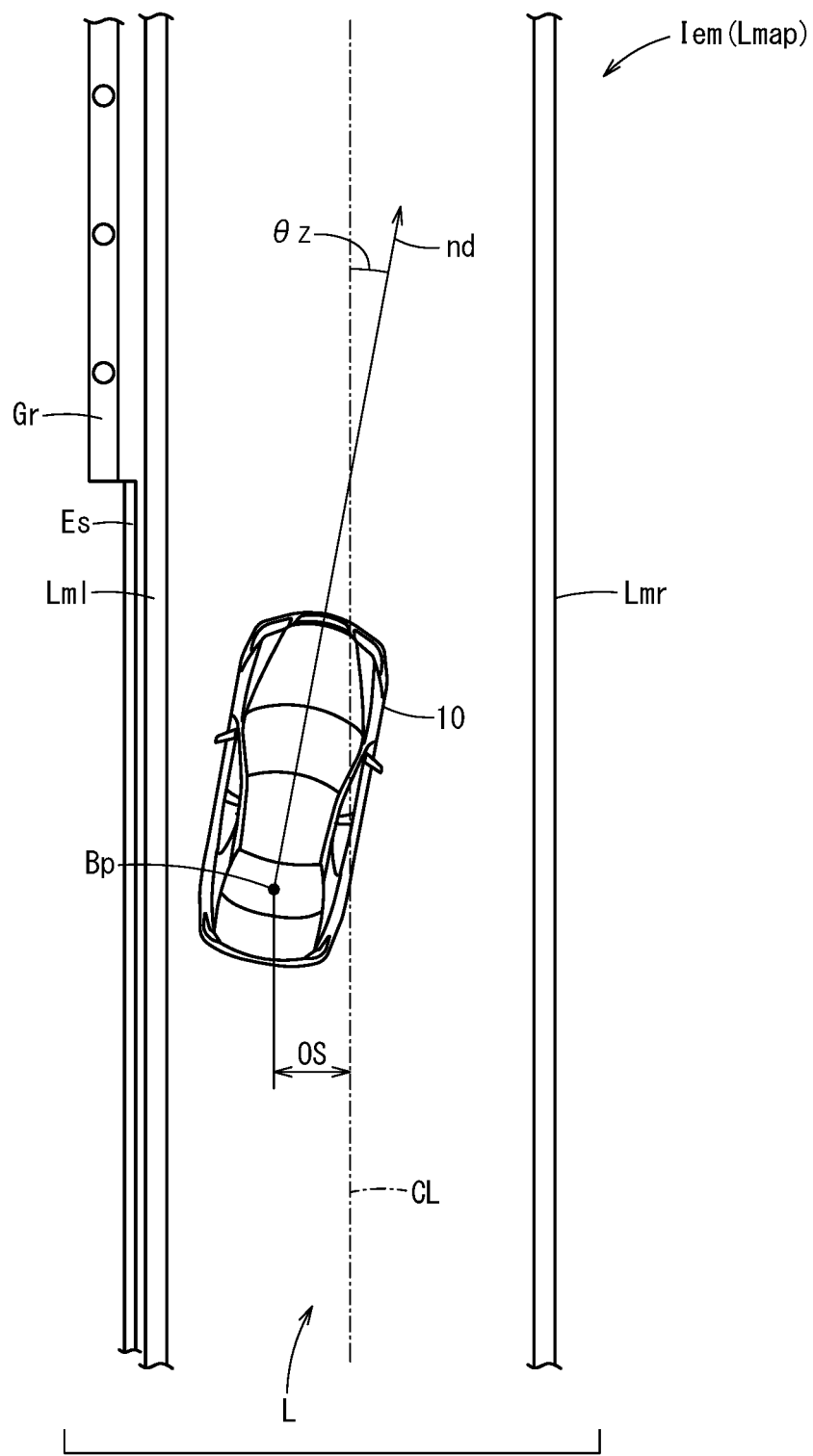
FIG. 3 is an exemplary illustration of an environment map.

FIG. 3 shows an example of an environment map (also referred to as a local environment map) Lmap that is stored as the environment map information Iem.

In this instance, the host vehicle state information Ivh is information obtained from the vehicle control unit 110, and is basically made up from an offset amount (position) OS of a reference point Bp of the vehicle 10, for example, a midpoint of a rear wheel axle from a center line CL of the lane L (which is partitioned by a right side lane marking Lmr and a left side lane marking Lml), a posture angle (also referred to as an azimuth angle) θz which is an angle between the center line CL and a nose direction nd of the vehicle 10, a speed vs, an acceleration va, a curvature ρ of the travel line, a yaw rate γ, and a steering angle δst, etc. The offset amount OS may be expressed as coordinates {x (a longitudinal direction which is the direction of the travel path), y (a lateral direction which is a direction perpendicular to the travel path)} from a reference position (arbitrary).

More specifically, as shown in the following equation (1), the host vehicle state information Ivh is the most recent information at that point in time of a later-described trajectory point sequence Pj {refer to equation (2)}.

$$Ivh=Ivh(x,y,\theta z,vs,va,\rho,\gamma,\delta st) \quad (1)$$

$$Pj=Pj(x,y,\theta z,vs,va,\rho,\gamma,\delta st), t=1,2,\ldots T \quad (2)$$

The trajectory point sequence Pj is corrected until later-described trajectory point sequence candidates Pcj(x, y, θz, vs, va, ρ, γ, δst) t=1, 2, . . . T are affirmatively evaluated, to result in the trajectory point sequence Pj(x, y, θz, vs, va, ρ, γ, δst) t=1, 2, . . . T which is an output trajectory. The term "t" corresponds to the time of an integer fraction (which may be changed depending on the speed vs) of the operation cycle Toc, with 1 being a first point, and T corresponding to the length of time of the trajectory that is generated, for example, at a point of one second or the like.

In FIG. 3, the lane L (the right lane marking Lmr and the left lane marking Lml) is the external environment recognition information Ipr that is recognized (using a known type of lane marking detection, a bird's-eye transformation, and a curve approximation process) by the external environment recognition unit 51 from the image information from the cameras 33.

In this manner, the environment map information Iem (environment map Lmap) is information indicative of the surrounding situation (a situation around the periphery of the host vehicle) of the road (lane markings Lm) with the vehicle position in the direction in which the host vehicle 10 is traveling serving as a reference, which is generated by combining the host vehicle state information Ivh and the external environment recognition information Ipr.

Moreover, in the local environment map generating unit 54, for example, in the case of a straight lane, the lane center line CL is generated as an optimum travel line, and in the case of a curved lane, a so-called out-in-out travel line with respect to the lane center line CL is generated as the optimum travel line. Such an optimum travel line is included in the environment map information Iem (environment map Lmap).

Moreover, in addition to the lane markings Lm, the (shape of the) lane L is defined by lane regulating objects such as a curbside Es, a guardrail Gr or the like.

Returning to FIG. 2, in response to an operation command Ac from the integrated control unit 70, the long-term term trajectory generating unit 71 refers to the environment map information Iem including the static external environment recognition information Iprs from which the dynamic external environment recognition information Iprd is excluded, the host vehicle state information Ivh, and a road map (curvatures of curbsides and the like) which is stored in the map information storage unit 42, generates a long-term trajectory Lt, for example, with an operation cycle of 9×Toc, and outputs the generated long-term trajectory Lt to the integrated control unit 70. The long-term trajectory Lt is stored as trajectory information It in a trajectory information storage unit 48 of the storage device 40.

More specifically, the long-term trajectory generating unit 71 generates a long-term trajectory (also referred to as a 10-sec trajectory) Lt corresponding to a relatively long time period (long distance), for example, a travel time on the order of 10 seconds, which is a trajectory for the purpose of carrying out a vehicle control in which emphasis is placed on riding comfort and comfortability of the vehicle 10 (in which rapid steering and rapid acceleration/deceleration are not performed), and for example, corresponds to a trajectory that is driven by a model driver who is skilled at driving, and which uses the static external environment recognition information Iprs without using the dynamic external environment recognition information Iprd, and in which the operation cycle is of a relatively long period taking place, for example, over a long period T1 (T1=9×Toc) on the order of several hundred ms.

In response to an operation command Ad from the integrated control unit 70, the medium-term trajectory generating unit 72 refers to the environment map information Iem (including the dynamic external environment recognition information Iprd and the static external environment recognition information Iprs), the host vehicle state information Ivh, and the long-term trajectory Lt, generates a medium-term trajectory Mt with an operation cycle of 3×Toc, and outputs the generated medium-term trajectory Mt to the integrated control unit 70. The medium-term trajectory Mt is stored as trajectory information It in the trajectory information storage unit 48.

For example, in the case that the external environment recognition unit 51 has discovered an obstacle (included in the dynamic external environment recognition information Iprd) such as a parked vehicle or the like in a frontward direction of the lane L, the medium-term trajectory generating unit 72 generates the medium-term trajectory Mt (also referred to as a 5-sec trajectory) corresponding to a relatively short time period (short distance), for example, a travel time on the order of several seconds, which is a trajectory (in the case of multiple lanes on one side, a trajectory including a lane change if necessary) for bypassing the parked vehicle or the like, and in which the operation cycle is of a relatively shorter period than the long period T1 taking place, for example, over a medium period Tm (Tm=3×Toc) on the order of one hundred and several tens of ms.

When the medium-term trajectory Mt is generated, in the case that the dynamic environment recognition information Iprd is not included within the environment map information Iem, as a result, the medium-term trajectory Mt substantially coincides with the long-term trajectory Lt.

In response to an operation command Ae from the integrated control unit 70, the short-term trajectory generating unit 73 refers to the medium-term trajectory Mt that was generated with reference to the environment map information Iem (including the dynamic external environment recognition information Iprd and the static external environment recognition information Iprs), the host vehicle state information Ivh, and the long-term trajectory Lt, generates a short-term trajectory St corresponding to the vehicle dynamics of the host vehicle 10 and with the shortest operation cycle Toc from among the three trajectory generating units, and outputs the generated short-term trajectory St to the integrated control unit 70, and simultaneously outputs the same to the vehicle control unit 110.

The vehicle control unit 110 controls the actuators 27 on the basis of the short-term trajectory St. The short-term trajectory St is stored as trajectory information It in the trajectory information storage unit 48.

When the short-term trajectory St is generated, in the case that the dynamic environment recognition information Iprd is not included within the environment map information Iem, as a result, the short-term trajectory St substantially coincides with the medium-term trajectory Mt that was generated with reference to the long-term trajectory Lt.

In this manner, the short-term trajectory generating unit 73 generates the short-term trajectory (referred to as a 1-sec trajectory) St corresponding to a relatively short time period (short distance) to be traveled henceforth, for example, a travel time on the order of one second, in which the operation cycle is of a relatively shorter period than the long period T1 and the medium period Tm, and takes place, for example, over a short period Ts (Ts=Toc) on the order of several tens of ms.

As the short-term trajectory St, for each short period Ts, there is generated a trajectory point sequence Pj(x, y, θz, vs, va, δst) as vehicle command values, generally on the basis of the position x in the longitudinal direction along the center line CL of the lane markings, the position y in the lateral direction, the posture angle θz, the speed vs, the acceleration va, and the steering angle δst (the steering angle δ of the vehicle 10 can be calculated in consideration of a gear ratio to the steering angle δst of the steering wheel), etc., {refer to the above-described equation (2)}.

In practice, before a final trajectory point sequence Pj is generated, a plurality of trajectory point sequence candidates Pcj (operation cycle: about Toc/5) are generated by the short-term trajectory generating unit 73 in each of the short periods Ts (Ts=Toc). As will be described later, concerning the generated trajectory point sequence candidates Pcj, within the same short period Ts, the trajectories are further evaluated by the short-term trajectory generating unit 73 on the basis of the vehicle dynamics, and thereafter, according to the evaluation results, corrections are made if necessary, and the trajectory point sequence Pj is generated as the output trajectory of the short-term trajectory St.

The vehicle control unit 110 converts the trajectory point sequence Pj into the vehicle control values Cvh, and outputs the values to the driving force device 28, the steering device 30, and the braking device 32, in a manner so that the vehicle 10 travels along the input short-term trajectory St, and more specifically, along the trajectory point sequence Pj that was generated and input on the order of the operation cycle Toc/5.

Description of Operations of the Embodiment

[Description According to the Flowchart]

Operations of the vehicle control device 12, which is basically configured in the manner described above, will be described in detail with reference to the flowchart of FIG. 4 in accordance with a manual driving mode, and the flowchart of FIG. 5 in accordance with an automated driving mode. The execution subject of the program according to the flowchart is the integrated control unit 70, etc., of the vehicle control device 12.

Figure 4:
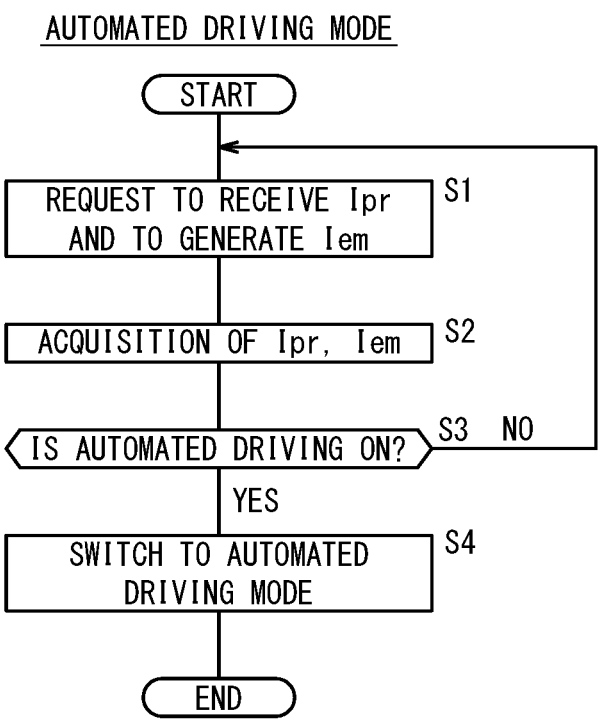
FIG. 4 is a flowchart provided to explain operations (in a manual driving mode) of the vehicle control device.

(A) Description of Flowchart of FIG. 4 in Accordance with Manual Driving Mode In step S1, the integrated control unit 70 transmits to the recognition result receiving unit 52 the operation command Aa to request reception of the external environment recognition information Ipr, and together therewith, transmits to the local environment map generating unit 54 the operation command Ab to request generation of the environment map information Iem.

In this case, the external environment recognition unit 51 generates the external environment recognition information Ipr, which is made up from the static external environment recognition information Iprs (lane shape information Iprsl, sign and marking information Iprsm) and the dynamic external environment recognition information Iprd (travel restraint source information Iprdc), which are recognized within the operation cycle Toc on the basis of the external environmental information (image information, radar emission and reflection information, and light beam irradiation and reflection information) from the cameras 33, the radar devices 34, and the non-illustrated LIDAR devices from among the external environment sensors 14, and transmits (outputs) such information to the recognition result receiving unit 52.

In response to the operation command Aa, the recognition result receiving unit 52 outputs the external environment recognition information Ipr (Iprs+Iprd) to the integrated control unit 70.

On the other hand, in synchronism with the operation command Ab, and within the operation cycle Toc, the local environment map generating unit 54 combines (merges) the host vehicle state information Ivh with the external environment recognition information Ipr, generates the environment map information Iem including the environment map Lmap shown in FIG. 3, and transmits the generated environment map information Iem to the integrated control unit 70.

In step S2, the integrated control unit 70 acquires the external environment recognition information Ipr and the environment map information Iem, and stores the acquired information in the storage device 40.

Moreover, at the first operation command Ab in step S1, the external environment recognition unit 51 does not generate the external environment recognition information Ipr, and therefore, the environment map information Iem is generated after a second generation request of step S1. Stated otherwise, the environment map information Iem is generated on the basis of the most recent vehicle state information Ivh, and the external environment recognition information Ipr that was generated in a preceding operation cycle Toc.

Next, in step S3, the integrated control unit 70 determines whether or not the automated driving switch 22 is set to an on-state automated driving mode.

In the case that the automated driving switch 22 is set to the off-state non-automated driving mode (step S3: NO), the processes of generating the external environment recognition information Ipr and the environment map information Iem of steps S1 and S2 are repeated.

In the case that the automated driving switch 22 is set to the on-state automated driving mode (step S3: YES), then in step S4, a switch is made instantaneously to the automated driving mode {also referred to as transitioning (switching over) from the non-automated driving mode to the automated driving mode}.

Description of Flowchart (First Exemplary Embodiment)

Figure 5:
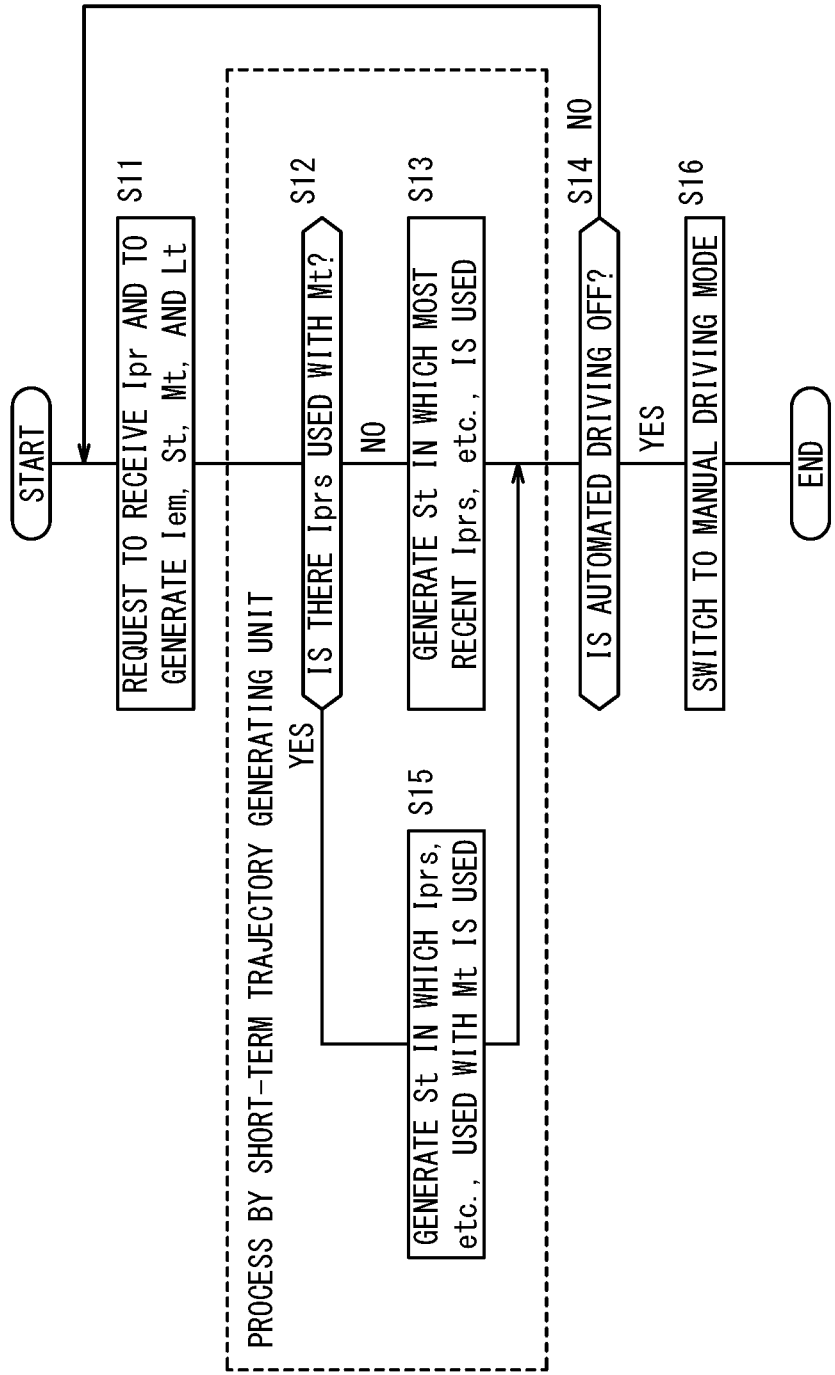
FIG. 5 is a flowchart (first exemplary embodiment) provided to explain operations (in an automated driving mode) of the vehicle control device.

(B) Description of Flowchart of FIG. 5 in Accordance with Automated Driving Mode (First Exemplary Embodiment), and Description of Operations of Vehicle Control Device 12 According to First Exemplary Embodiment In step S11, the integrated control unit 70 simultaneously transmits to the recognition result receiving unit 52, the local environment map generating unit 54, the short-term trajectory generating unit 73, the medium-term trajectory generating unit 72, and the long-term trajectory generating unit 71, respectively, the operation command Aa to request reception of the external environment recognition information Ipr, the operation command Ab to request generation of the environment map information Iem, the operation command Ac to request generation of the short-term trajectory St, the operation command Ad to request generation of the medium-term trajectory Mt, and the operation command Ae to request generation of the long-term trajectory Lt.

In this case, in synchronism with an initial calculation cycle Toc, the short-term trajectory generating unit 73 is capable of generating the short-term trajectory St on the basis of the environment map information Iem that is generated just prior thereto, and the host vehicle state information Ivh obtained at the starting time.

The medium-term trajectory generating unit 72 is capable of generating an initial medium-term trajectory Mt which includes the initial calculation cycle Toc, and occurs after an operation cycle 3×Toc that is three times the operation cycle, and thereafter, generates the medium-term trajectory Mt at each instance of the operation cycle 3×Toc.

The long-term trajectory generating unit 71 is capable of generating an initial long-term trajectory Lt which includes the initial calculation cycle Toc, and occurs after an operation cycle 9×Toc that is nine times the operation cycle, and thereafter, generates the long-term trajectory Lt at each instance of the operation cycle 9×Toc.

Thus, a description will be given of the following step S12 and thereafter, concerning the short-term trajectory generation process that takes place in the short-term trajectory generating unit 73 according to a principal component of the present invention.

The present embodiment, basically, has the object of avoiding any mismatching (inconsistency) between the static external environment recognition information Iprs within the external environment recognition information Ipr that is used when the short-term trajectory generating unit 73 generates the short-term trajectory St, and the dynamic external environment recognition information Iprs that is used when the medium-term trajectory generating unit 72 generates the medium-term trajectory Mt, to thereby generate a stabilized short-term trajectory St. It should be noted that, when the short-term trajectory generating unit 73 generates the short-term trajectory St, concerning the dynamic external environment recognition information Iprd, the most recent information thereof is used.

Inherently, the static external environment recognition information Iprs, such as lane markings, stop lines, or the like, does not undergo a change by the external environment recognition unit 51 within the operation period (which is less than Toc). However, there may be cases in which the lane markings or the stop lines are momentarily interrupted within the image information due to the presence of backlighting, puddles, or the like.

In such a case, mismatching occurs between the most recent static external environment recognition information Iprs that is used by the short-term trajectory generating unit 73, and the static external environment recognition information Iprs that is used by the medium-term trajectory generating unit 72.

Therefore, when the short-term trajectory generating unit 73 generates the short-term trajectory St, in step S12, a determination is made as to whether or not there is static external environment recognition information Iprs that is used when the medium-term trajectory generating unit 72 generates the medium-term trajectory Mt.

If not (step S12: NO), then in step S13, the short-term trajectory generating unit 73 uses the most recent static external environment recognition information Iprs, the dynamic external environment recognition information Iprd, and the vehicle state information Ivh, generates the short-term trajectory St, and executes automated driving.

Next, in step S14, a determination is made as to whether or not the automated driving switch 22 is set to the off-state non-automated driving mode (manual driving mode).

In the case that the automated driving switch 22 is set to the on-state automated driving mode (step S14: NO), the processes of step S11 and thereafter are repeated, and normally, after the operation cycle 3×Toc has elapsed, the determination of step S12 becomes affirmative (step S12: YES), and the process of generating the short-term trajectory St is executed in step S15.

In the process of generating the short-term trajectory St in step S15, the short-term trajectory St is generated using the static external environment recognition information Iprs used by the medium-term trajectory generating unit 72, the most recent dynamic external environment recognition information Iprd, and the vehicle state information Ivh, and automated driving is continued.

Moreover, in the determination of step S14, in the case that the automated driving switch 22 is set to the off-state manual driving mode (step S14: YES), then in step S16, a switch is made to the manual driving mode.

[Description in Accordance with Time Chart]

Next, with reference to the time chart of FIG. 6 (first exemplary embodiment), operations of the vehicle control device 12 according to the first exemplary embodiment will be described.

Figure 6:
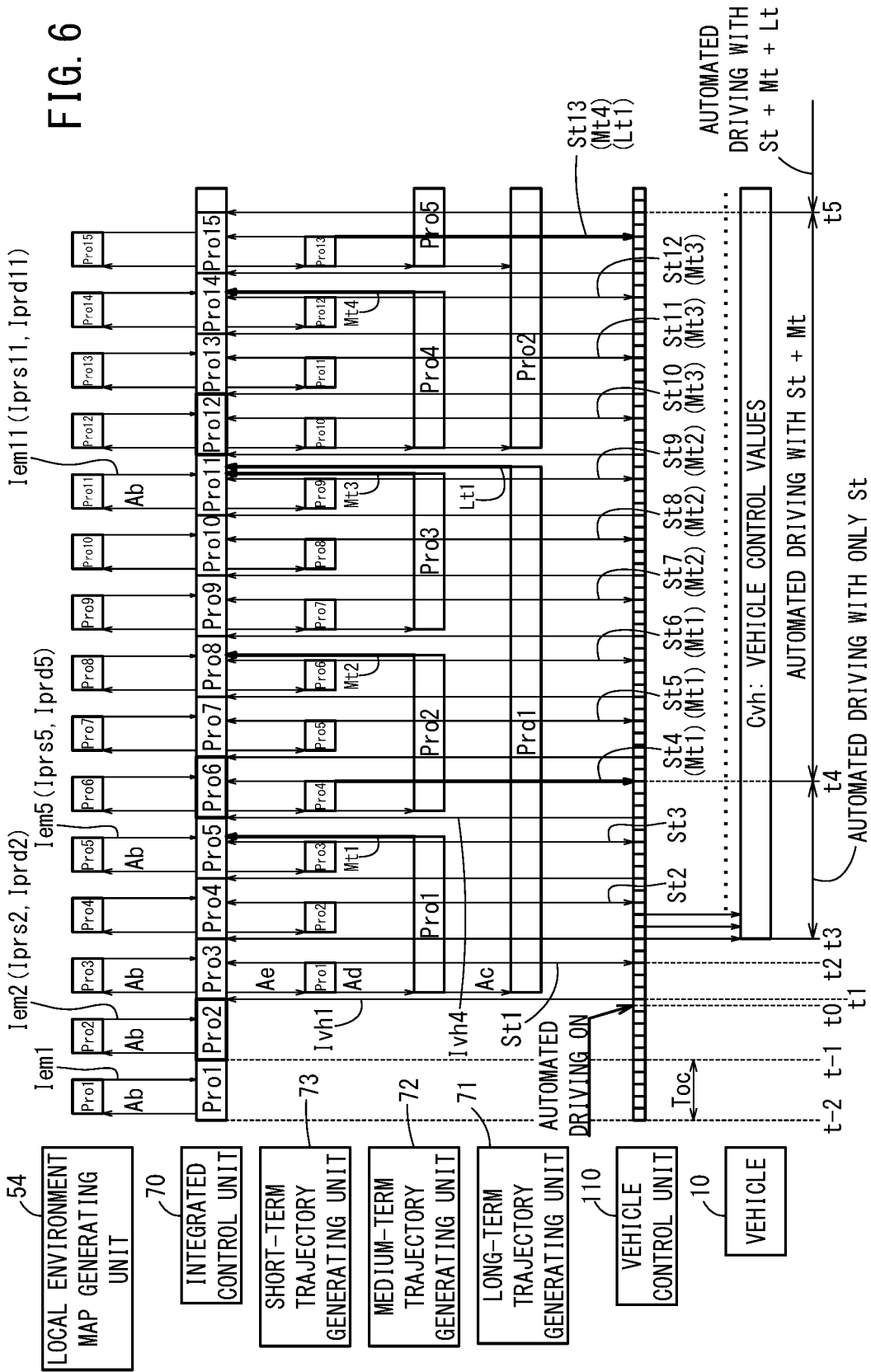
FIG. 6 is a time chart (first exemplary embodiment) provided to explain operations of the vehicle control device.

In FIG. 6, at time t0, the manual driving mode (automated driving OFF state) is switched to the automated driving mode (automated driving ON state) by an operation of the automated driving switch 22 made by the driver or the like.

At time t-2 prior to time t0 (a point in time at the leftmost end in FIG. 6), the integrated control unit 70, in the vicinity of initiation of a process Pro1 corresponding to the operation cycle Toc, transmits to the recognition result receiving unit 52 (see FIGS. 1 and 2) the operation command Aa (not shown in FIG. 6) to request reception of the external environment recognition information Ipr, together with transmitting to the local environment map generating unit 54 the operation command Ab to request generation of the local environment map information Iem (corresponding to step S1).

In response to the operation command Ab at time t-2, the local environment map generating unit 54 generates environment map information Iem1 substantially at the time of the operation cycle Toc, and outputs the environment map information Iem1 to the integrated control unit 70.

Moreover, since the environment map information Iem1 is combined information of the external environment recognition information Ipr and the host vehicle state information Ivh, before the process Pro1 of generating the environment map information Iem is ended, in response to the operation command Aa, the external environment recognition information Ipr received from the external environment recognition unit 51 is transmitted via the integrated control unit 70 from the recognition result receiving unit 52 to the local environment map generating unit 54. However, due to lack of space on the drawing sheet, the processes of the operation command Aa and the external environment recognition information Ipr are omitted from illustration.

As mentioned above, at time t0 before time t1 at which the process Pro2 of the integrated control unit 70 is ended, it is assumed that the automated driving switch 22 has been operated to the ON state (step S3: YES).

At time t1 at the end point of the process Pro2 of the integrated control unit 70, in response to the automated driving switch 22 being operated to be placed in the ON state, the vehicle control unit 110 transmits the vehicle state information Ivh1 to the integrated control unit 70.

In this case, at the ending time t3 of the process Pro3 of the operation cycle Toc, on the basis of the vehicle control values Cvh generated only by the short-term trajectory St1 which is input from the short-term trajectory generating unit 73 at time t2 immediately prior to time t3, the actuators 27 (the driving force device 28, the steering device 30, and the braking device 32) are controlled by the vehicle control unit 110 to execute automated driving (corresponding to a first instance of step S13).

On the other hand, in response to the automated driving switch 22 being placed in the ON state, in the vicinity of a point in time when the process Pro3 by the integrated control unit 70 is started, the operation commands Ae, Ad, and Ac to request generation of the short-term trajectory St3, the medium-term trajectory Mt1, and the long-term trajectory Lt1 are transmitted respectively from the integrated control unit 70 to the short-term trajectory generating unit 73, the medium-term trajectory generating unit 72, and the long-term trajectory generating unit 71 (corresponding to step S11).

Then, during the process Pro5 (of the integrated control unit 70) when the operation cycle Toc has elapsed roughly three times, the medium-term trajectory Mt1 of the process Pro1 (of the medium-term trajectory generating unit 72) is generated, and is transmitted via the integrated control unit 70 to the short-term trajectory generating unit 73.

In this case, in the process Pro6 (of the integrated control unit 70) during the next operation cycle Toc, or stated otherwise, in the process Pro4 of the short-term trajectory generating unit 73, normally, the short-term trajectory St4 is generated in which the travel line of the vehicle 10 becomes smoother in consideration of the medium-term trajectory Mt1 of the 5-sec trajectory, and is output to the vehicle control unit 110 together with being output to the integrated control unit 70.

Moreover, having taken into consideration the medium-term trajectory Mt1, when the short-term trajectory generating unit 73 generates the short-term trajectory St4, the surrounding environment is considered on the basis of the speed vs, the acceleration va, the yaw rate γ, and the steering angle δst at the current position of the host vehicle 10, and a plurality of trajectory point sequence candidates Pcj for selection of the short-term trajectory St4 are generated from the current position (starting point) of the host vehicle 10 to a target point (end point) after 1 [sec].

Additionally, this implies that the respective trajectory point sequence candidates Pcj for the generated short-term trajectory St4 are evaluated on the basis of a later-described evaluation function with respect to the trajectory point sequence Pj of the medium-term trajectory Mt1, together with being evaluated on the basis of a later-described other evaluation function with respect to the environment map Lmap (it should be noted that the environment map Lmap corresponds to the static external environment recognition information Iprs2 within the environment map information Iem2 acquired at time t1 by the medium-term trajectory generating unit 72 from the local environment map generating unit 54 via the recognition result receiving unit 52, and the dynamic external environment recognition information Iprd5 within the most recent environment map information Iem5 acquired by the short-term trajectory generating unit 73 from the local environment map generating unit 54 via the recognition result receiving unit 52 at the starting time of the process Pro4), the trajectory point sequence candidate Pcj with a high evaluation is selected, and the short-term trajectory St4 is generated in which the selected trajectory point sequence candidate Pcj is taken as the trajectory point sequence Pj.

The trajectory point sequence Pj of the short-term trajectory St4 is converted through the vehicle control unit 110 into the vehicle control values Cvh at a period of the operation cycle Toc+5, and is output to the actuators 27 to thereby perform automated driving in consideration of adaptability and responsiveness of the vehicle 10 with respect to the external environment (in FIG. 6, the interval from time t4 to time t5 which is marked "automated driving with St+Mt").

In this case, in the evaluation function of the trajectory point sequence Pj of the medium-term trajectory Mt1, the evaluation is set so as to become higher as the deviation (deviation concerning the vehicle control values Cvh) of the respective elements (position x,y, speed vs, steering angle δst) at points corresponding to the respective trajectory point sequence candidates Pcj of the short term trajectory St4 and the trajectory point sequence Pj of the medium-term trajectory Mt1 is smaller. Further, in the evaluation function with respect to the environment map Lmap (the lane L and the optimum travel line of the host vehicle 10 generated from the static external environment recognition information Iprs2, the dynamic external environment recognition information Iprd5, and the host vehicle state information Ivh4, for example, a lane center line CL in the case of a straight lane, and an out-in-out travel line in the case of a curved lane), the evaluation is set so as to become higher as the deviation (positional deviation in relation to the lane L) between the positions x,y of the respective trajectory point candidates Pcj of the short term trajectory St4 and the optimum travel line, etc., of the environment map Lmap is smaller. The trajectory point sequence candidate Pcj having the highest weighted sum of the evaluation values of both evaluation functions is set as the trajectory point sequence Pj of the short-term trajectory St4.

Next, during the process Pro11 by the integrated control unit 70 when the operation cycle Toc has elapsed roughly nine times from time t1, the long-term trajectory Lt1 is generated in the process Pro1 of the long-term trajectory generating unit 71, and in the process Pro15 (of the integrated control unit 70) during the operation period Toc, in consideration of the long-term trajectory Lt1 of the 10-sec trajectory and the medium-term trajectory Mt3 of the 5-sec trajectory, the short-term trajectory St13 of the vehicle 10 is generated in the process Pro13 of the short-term trajectory generating unit 73.

The short term trajectory St13 having taken into consideration the long-term trajectory Lt1 and the medium-term trajectory Mt3 implies that, for example, when the medium-term trajectory generating unit 72 generates the medium-term trajectory Mt4 in the process Pro4, similar to what was described with the generation process of the short-term trajectory St4, a plurality of candidates for the medium-term trajectory Mt4 made up from a plurality of trajectory point sequence candidates Pcj are generated, the generated respective trajectory point sequence candidates Pcj are evaluated on the basis of the evaluation function of the trajectory point sequence Pj of the long-term trajectory Lt1, and are evaluated on the basis of the evaluation function of the environment map Lmap (in this case, it should be noted that the environment map Lmap corresponds to the static external environment recognition information Iprs11, and the dynamic external environment recognition information Iprd11 within the most recent environment map information Iem11), and the trajectory point sequence candidate Pcj for which the evaluation thereof is high is set as the trajectory point sequence Pj of the medium-term trajectory Mt4.

Furthermore, in this manner, the implication is that the medium-term trajectory Mt4 generated with reference to the long-term trajectory Lt1, and the plurality of candidates for the short-term trajectory St13 are evaluated by the evaluation functions as described above, whereby the short-term trajectory St13 is generated with reference to the medium-term trajectory Mt4 that was generated with reference to the long-term trajectory Lt1.

At time t5 and thereafter, in the interval that is marked "automated driving with St+Mt+Lt", automated driving is executed in which adaptability and responsiveness, taken in consideration of riding comfort being sufficiently close to the driving sensation of the driver, is extremely superior.

Description of Flowchart (Second Exemplary Embodiment)

Figure 7:
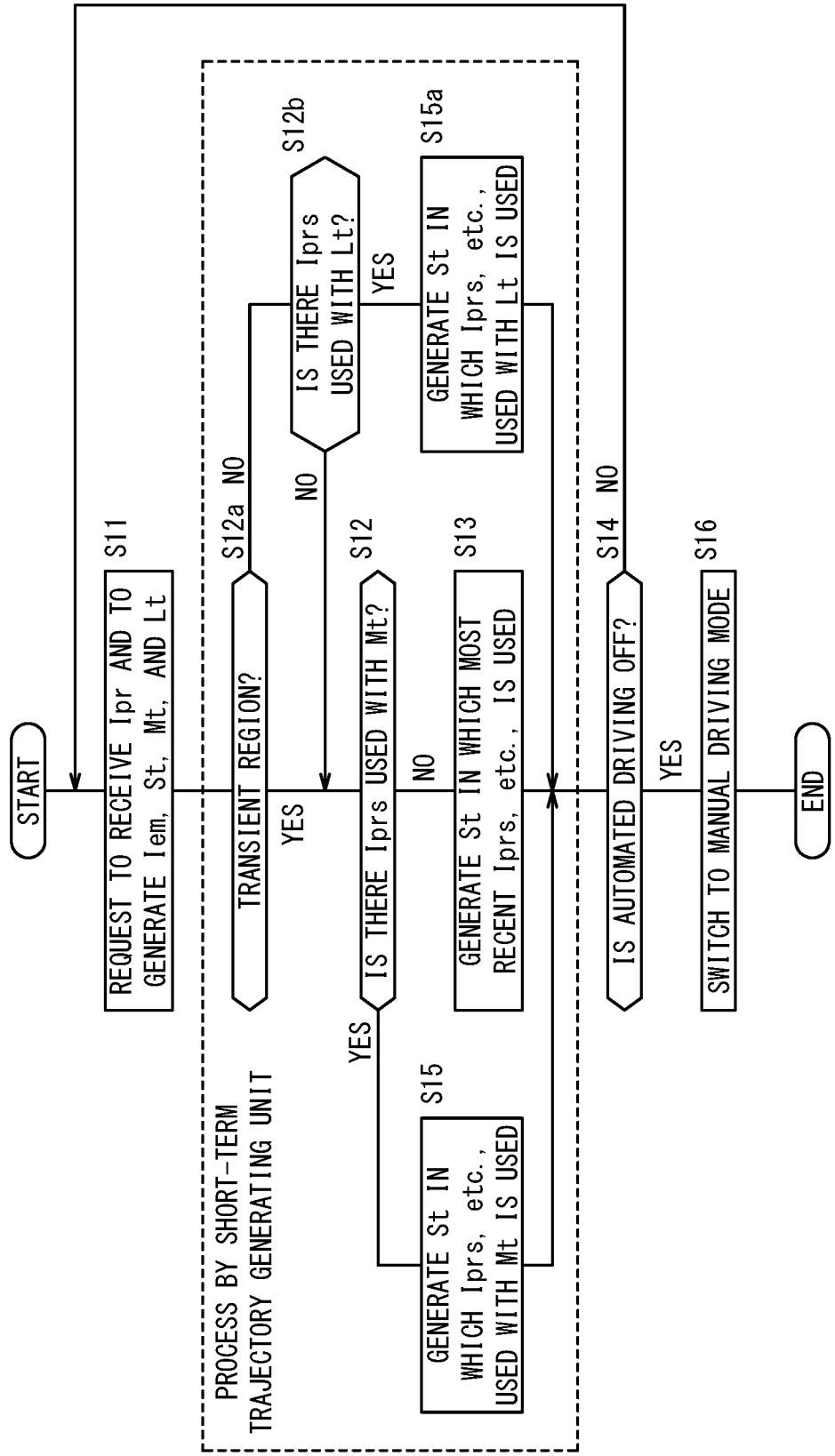
FIG. 7 is a flowchart (second exemplary embodiment) provided to explain operations (in an automated driving mode) of the vehicle control device.

(C) Description of Flowchart of FIG. 7 in Accordance with Automated Driving Mode (Second Exemplary Embodiment), and Description of Operations of Vehicle Control Device 12 According to Second Exemplary Embodiment The flowchart of FIG. 7, in comparison with the flowchart of FIG. 5, differs only in that the processes of step S12a, step S12B, and step S15a are added.

More specifically, when the short-term trajectory generating unit 73 generates the short-term trajectory St, in step S12a, whether or not an environmental region in which automated driving is intended to take place is a transient region is determined on the basis of the static external environment recognition information Iprs and/or a road map (a curvature determination of curves or the like) that is stored in the map information storage unit 42. In greater detail, it is confirmed whether or not a change in the steering angle δst, such as when entering a curve or turning to the left or right, is a change greater than or equal to a threshold value, and in the case it is determined that it is a transient region where the change is greater than or equal to the threshold value (step S12a: YES), the processes of step S12 and thereafter are executed.

On the other hand, when traveling straight or when traveling on a curve with good visibility, in the case it is determined that the change in the steering angle δst is a change that is less than the threshold value and it is not a transient region (step S12a: NO), then in step S12b, when the short-term trajectory St is generated in the short-term trajectory generating unit 73, a determination is made as to whether or not there is static external environment recognition information Iprs that is used when the long-term trajectory generating unit 71 generates the long-term trajectory Lt.

If there is not a transient region (step S12b: NO), the above-described processes of step S12 and thereafter are executed.

If there is a transient region (step S12b: YES), then in the process of generating the short-term trajectory St in step S15a, the short-term trajectory St is generated using the static external environment recognition information Iprs used by the long-term trajectory generating unit 71, the most recent dynamic external environment recognition information Iprd, and the host vehicle state information Ivh, and automated driving is continued until the determination of step S14 becomes affirmative (step S14: YES).

According to the second exemplary embodiment, in the case there is not a transient region, since the short-term trajectory St is extremely similar to the long-term trajectory Lt, it is possible to perform an extremely stable trajectory output in which any inconsistency of the external environmental information (environmental information) is suppressed.

When a description is given with the time chart of FIG. 6, in the process Pro13 of the short-term trajectory generating unit 73, the static external environment recognition information Iprs2, which is acquired at time t1 by the long-term trajectory generating unit 71, is used as the static external environment recognition information Iprs. Incidentally, according to the second exemplary embodiment, even in the process Pro4 of the medium-term trajectory generating unit 72, the static external environment recognition information Iprs2, which is acquired at time t1 by the long-term trajectory generating unit 71, is used as the static external environment recognition information Iprs.

[Summary]

FIG. 8A is a time chart according to a comparative example, and FIG. 8B is a time chart according to the first exemplary embodiment (the static external environment recognition information Iprs used by the short-term trajectory generating unit 73 uses the same static external environment recognition information Iprs as used by the medium-term trajectory generating unit 72) in which the time chart shown in FIG. 6 is drawn in a deformed manner in order to facilitate understanding. Time t1 in FIG. 6 corresponds to time t11 in FIGS. 8A and 8B.

In the comparative example of FIG. 8A, in relation to the static external environment recognition information Iprs such as the lane shape information Iprs1 or the like, the long-term trajectory generating unit 71, the medium-term trajectory generating unit 72, and the short-term trajectory generating unit 73 respectively generate trajectories using the most recent version thereof.

For example, the short-term trajectory generating unit 73 generates the short-term trajectory St14 using the static external environment recognition information Iprs obtained at time t24 in the process Pro14.

In the process Pro5, the medium-term trajectory generating unit 72 generates a medium-term trajectory Mt5 (not shown) using the static external environment recognition information Iprs and the dynamic external environment recognition information Iprd obtained at time t23.

The long-term trajectory generating unit 71 generates the long-term trajectory Lt using the static external environment recognition information Iprs obtained at time t20 in the process Pro2.

In this manner, with respect to the static external environment recognition information Iprs within the external environment recognition information Ipr that is used when the short-term trajectory generating unit 73 generates the short-term trajectory St, a mismatching (inconsistency) occurs with the dynamic external environment recognition information Iprs that is used when the long-term trajectory generating unit 71 and the medium-term trajectory generating unit 72 respectively generate the long-term trajectory Lt and the medium-term trajectory Mt.

According to the first exemplary embodiment shown in FIG. 8B, concerning the static external environment recognition information Iprs such as the lane shape information Iprsl or the like, the information that is used by the higher order medium-term trajectory generating unit 72 is used by the lower order short-term trajectory generating unit 73.

For example, in the process Pro14, the short-term trajectory generating unit 73 generates the short-term trajectory St14 using the static external environment recognition information Iprs obtained at time t20 by the medium-term trajectory generating unit 72.

In the process Pro5, the medium-term trajectory generating unit 72 generates a medium-term trajectory Mt5 (not shown) using the static external environment recognition information Iprs and the dynamic external environment recognition information Iprd obtained at time t23.

FIG. 9A is a time chart according to the same comparative example as that shown in FIG. 8A, and FIG. 9B is a time chart according to the second exemplary embodiment in which the time chart shown in FIG. 6 is drawn in a deformed manner in order to facilitate understanding. Time t1 in FIG. 6 corresponds to time t11 in FIGS. 9A and 9B.

According to the second exemplary embodiment shown in FIG. 9B, on the premise that there is not a transient region (step S12*a*: NO), and static external environment recognition information Iprs exists that was used when generating the long-term trajectory Lt (step S12*b*: YES), the information in which the static external environment recognition information Iprs such as the lane shape information Iprsl or the like that was used by the higher order long-term trajectory generating unit 71 is used by the medium-term trajectory generating unit 72 and the short-term trajectory generating unit 73.

For example, in the process Pro14, the short-term trajectory generating unit 73 generates the short-term trajectory St14 using the static external environment recognition information Iprs acquired by the medium-term trajectory generating unit 72 at time t11, and the dynamic external environment recognition information Iprd acquired by itself at time t24.

Further, in the process Pro5, the medium-term trajectory generating unit 72 generates a medium-term trajectory Mt5 (not shown) using the static external environment recognition information Iprs acquired at time t11, and the dynamic external environment recognition information Iprd acquired at time t23.

Moreover, concerning usage of the static external environment recognition information Iprs at time t11 in the lower order medium-term trajectory generating unit 72 and the short-term trajectory generating unit 73, when the long-term trajectory generating unit 71 has generated a long-term trajectory Lt2 (not shown) in the process Pro2, usage thereof is stopped, and a changed is made to the static external environment recognition information Iprs at time t20.

[Summary]

According to the embodiments described above, the vehicle control device 12 that controls the vehicle 10 configured to be driven automatically, is equipped with the external environment recognition unit 51 configured to recognize the lane shape of the lane in which at least the host vehicle 10 travels, from external environmental information that is detected by the external environment sensors 14, and generate the static external environment recognition information Iprs including the recognized lane shape information Iprsl, together with generate the dynamic external environment recognition information Iprd including the travel restraint source information Iprdc such as an obstacle, a traffic participant, or the color of a traffic signal or the like, and to generate the external environment recognition information Ipr (Ipr=Iprs+Iprd), the short-term trajectory generating unit 73 as a first trajectory generating unit configured to generate, using the static external environment recognition information Iprs, the short-term trajectory St as a first trajectory in the short period Ts as a first operation cycle having a relatively short operation cycle, and the medium-term trajectory generating unit 72 configured to generate, using the external environment recognition information Ipr (Ipr=Iprs+Iprd), the medium-term trajectory Mt as a second trajectory that is longer than the short-term trajectory St in a medium period Tm as a second operation cycle that is longer than the short period Ts, and the integrated control unit 70 configured to control the short-term trajectory generating unit 73 and the medium-term trajectory generating unit 72.

The external environment recognition unit 51 is configured to perform the recognition process in a period that is less than or equal to that of the short period Ts (first operation cycle), and in the case that the static external environment recognition information Iprs that is used by the medium-term trajectory generating unit 72 (second trajectory generating unit) exists, the integrated control unit 70 is configured to cause the short-term trajectory generating unit 73 (first trajectory generating unit) to use the static external environment recognition information Iprs, and to generate the short-term trajectory St (first exemplary embodiment).

In this manner, since the short-term trajectory St (first trajectory) is generated by using in the short-term trajectory generating unit 73 (first trajectory generating unit) the static external environment recognition information Iprs that was used by the medium-term trajectory generating unit 72 (second trajectory generating unit), any mismatching (inconsistency) of the static external environment recognition information Iprs with the medium-term trajectory Mt (second trajectory) that is used by the short-term trajectory generating unit 73 (second trajectory generating unit) is suppressed, and a stabilized trajectory output from the short-term trajectory generating unit 73 (first trajectory generating unit) is obtained.

To offer a more detailed explanation, supposing that, in the case that the short-term trajectory generating unit 73 (first trajectory generating unit), which is of a lower hierarchical order, were to perform trajectory optimization using the most recent external environment recognition information Ipr (Ipr=Iprs+Iprd) and the medium-term trajectory Mt (second trajectory), in practice, even if the external environmental information (environmental information) has not changed, due to a recognition error of the external environment recognition unit 51, static external environmental information Iprs that differs from the static external environmental information Iprs used by the higher order medium-term trajectory generating unit 72 (second trajectory generating unit) ends up being used. In this case, the medium-term trajectory Mt (second trajectory) does not become an optimal solution with respect to the most recent static external environmental information Iprs, an unnecessary multi-modality (essentially, at a location where there is one peak point with the highest degree of similarity, the peak point becomes multiple points) is generated in the evaluation function for evaluating the short-term trajectory St (first trajectory) {for example, when selecting a trajectory point sequence Pj for the short-term trajectory St (first trajectory) from a plurality of trajectory point sequence candidates Pcj generated as candidates for the short-term trajectory St (first trajectory), a function to select the trajectory point sequence candidate Pcj for the short-term trajectory St (first trajectory) for which the degree of similarity thereof with the trajectory point sequence Pj of the higher order medium-term trajectory Mt (second trajectory) is highest}, and there is a possibility that the short-term trajectory St (first trajectory) which is the output trajectory may become unstable.

In actuality, although such a recognition error (recognition noise) applies to a lane shape that is made up from white lines, stop lines, or the like, such an error is intrinsically static (without change or movement), and by the lower order short-term trajectory generating unit 73 (first trajectory generating unit) referring to the external environment recognition information Ipr (Iprs is the same, Iprd is different), a portion of which (the lane shape information Iprsl, etc.) is the same as the static external environmental information Iprs referred to by the higher order medium-term trajectory generating unit 72 (second trajectory generating unit), it is possible to suppress any inconsistency between the external environmental information (environment map information Iem) and the medium-term trajectory Mt (second trajectory), which is the higher order trajectory referred to by the lower order short-term trajectory generating unit 73 (first trajectory generating unit).

As described above, in the external environment recognition information Ipr, in addition to the static external environment recognition information Iprs including the lane shape information Iprsl, there is included the travel restraint source information Iprdc, which is dynamic external environment recognition information Iprd including a traffic participant that restrains traveling of the host vehicle. In this case, the integrated control unit 70 causes the short-term trajectory generating unit 73 (first trajectory generating unit) to use the static external environment recognition information Iprs that was used by the medium-term trajectory generating unit 72 (second trajectory generating unit), and for the dynamic external environment recognition information Iprd, is configured to cause the most recent dynamic external environment recognition information Iprd to be used.

In this manner, when the short-term trajectory generating unit 73 (first trajectory generating unit) generates the short-term trajectory St (first trajectory) which is shorter than the medium-term trajectory Mt (second trajectory), in the short period Ts (first operation cycle) that is shorter than the medium period Tm (second operation cycle) of the medium-term trajectory generating unit 72 as the second trajectory generating unit, since the dynamic external environment recognition information Iprd is generated with reference to the most recent dynamic external environment recognition information Iprd that is recognized within the short period Ts (first operation cycle) or less, it is possible to generate the short-term trajectory St (first trajectory) in which the responsiveness of the vehicle 10 with respect to traffic participants or the like is not reduced.

As discussed above, the external environment recognition information Ipr includes, in addition to the lane shape information Iprsl, the sign and marking information Iprsm that regulates traveling of the host vehicle 10, and the integrated control unit 70 is configured to cause the medium-term trajectory generating unit 72 (second trajectory generating unit) to use the sign and marking information Iprsm, together with causing the short-term trajectory generating unit 73 (first trajectory generating unit) to use the sign and marking information Iprsm that is used by the medium-term trajectory generating unit 72.

For example, because the short-term trajectory generating unit 73 (first trajectory generating unit) is made to use the sign and marking information Iprsm that is used by the medium-term trajectory generating unit 72 (second trajectory generating unit) and which regulates traveling, such as signs indicating a maximum speed or stop lines or the like, the medium-term trajectory Mt (second trajectory) generated by the medium-term trajectory generating unit 72 (second trajectory generating unit), in which a smooth transition of the speed vs of the vehicle 10 or a smooth stopping of the vehicle 10 is preformed, can be used by the short-term trajectory generating unit 73 (first trajectory generating unit).

In this case, if the long-term trajectory generating unit 71 is included as a third trajectory generating unit, which is controlled by the integrated control unit 70, and configured to generate the long-term trajectory Lt as a third trajectory that is longer than the medium-term trajectory Mt, with reference to the static external environment recognition information Iprs in the long period T1 as a third operation cycle that is longer than the medium period Tm (second operation cycle), then when automated driving is started, the integrated control unit 70 may be configured to cause the short-term trajectory generating unit 73 (first trajectory generating unit), the medium-term trajectory generating unit 72 (second trajectory generating unit), and the long-term trajectory generating unit 71 (third trajectory generating unit) to simultaneously start generation of each of respective trajectories, before the medium-term trajectory Mt (second trajectory) is generated, cause the short-term trajectory generating unit 73 (first trajectory generating unit) to generate the short-term trajectory St (first trajectory) with reference to the most recent external environment recognition information Ipr, when the medium-term trajectory Mt (second trajectory) is generated, cause the short-term trajectory generating unit 73 (first trajectory generating unit) to generate the short-term trajectory St (first trajectory) with reference to the static external environment recognition information Iprs including the medium-term trajectory Mt (second trajectory) and the lane shape determined with reference to the medium-term trajectory generating unit 72 (second trajectory generating unit), and when the long-term trajectory Lt (third trajectory) is generated, cause the short-term trajectory generating unit 73 to generate the short-term trajectory St using the external environment recognition information Ipr including the long-term trajectory Lt (third trajectory) and the lane shape information Iprsl that is used by the long-term trajectory generating unit 71 (third trajectory generating unit).

When automated driving is set to the ON state, by way of the short-term trajectory generating unit 73, the medium-term trajectory generating unit 72, and the long-term trajectory generating unit 71, at first, the vehicle 10 is controlled in accordance with the short-term trajectory St that was generated by the short-term trajectory generating unit 73 (first trajectory generating unit) for which the operation cycle thereof is the shortest operation cycle Toc, next, the vehicle 10 is controlled with the short-term trajectory St (first trajectory) made with reference to the medium-term trajectory Mt (second trajectory) that was generated by the medium-term trajectory generating unit 72 (second trajectory generating unit) for which the operation cycle thereof is the next shortest operation cycle 3×Toc, and next, the vehicle 10 is controlled with the short-term trajectory St generated with reference to the medium-term trajectory Mt made with reference to the long-term trajectory Lt that was generated by the long-term trajectory generating unit 71 for which the operation cycle thereof is the longest operation cycle 9×Toc. For this reason, automated driving can be started immediately on the basis of the short-term trajectory St, and a transition can gradually be made in a stepwise manner to automated driving in consideration of the medium-term trajectory Mt and the long-term trajectory Lt in which riding comfort and comfortability are improved. In this case, it is possible to suppress any inconsistency of the external environmental information (environment map information Iem) with the higher order trajectories (the long-term trajectory Lt with respect to the medium-term trajectory Mt, and the medium-term trajectory Mt and the long-term trajectory Lt with respect to the short-term trajectory St) referred to by the lower order trajectory generating unit (the medium-term trajectory generating unit 72 with respect to the long-term trajectory generating unit 71, and the short-term trajectory generating unit 73 with respect to the long-term trajectory generating unit 71 and the medium-term trajectory generating unit 72), and to perform trajectory output in a stabilized manner.

In the external environment recognition information Ipr, in addition to the lane shape information Iprsl, or the lane shape information Iprsl and the sign and marking information Iprsm, there is further included the travel restraint source information Iprdc that restrains traveling of the host vehicle 10, and the integrated control unit 70 is configured to cause only the short-term trajectory generating unit 73 (first trajectory generating unit) to refer to (use) the travel restraint source information Iprdc without it being used (referred to) by the long-term trajectory generating unit 71.

Riding comfort (smoothness of changes in the behavior of the vehicle) is emphasized in the long-term trajectory Lt as a third trajectory which is a relatively long-term trajectory, whereas adaptability and responsiveness to the recognized external environment are emphasized in the medium-term trajectory Mt as a second trajectory which is a medium-term trajectory, and the short-term trajectory St as a first trajectory which is a short-term trajectory. Therefore, when the short-term trajectory St and the medium-term trajectory Mt are generated, by referring to the travel restraint source information Iprdc that restrains traveling of the host vehicle 10, while adaptability and responsiveness to the external environment are maintained, and by controlling the vehicle 10 by the short-term trajectory St while indirectly referring to the long-term trajectory Lt that was generated with reference to the lane shape, automated driving can be performed in which riding comfort (comfortableness) is taken into consideration.

The lane shape information Iprsl is information recognized from a lane regulating object such as the lane L, or a curbside Es, a guardrail Gr or the like provided on the road surface, and the travel restraint source information Iprdc is information including an obstacle, a traffic participant, or the color of a traffic signal.

The long-term trajectory generating unit 71 (third trajectory generating unit) is capable of generating a trajectory (the long-term trajectory Lt) in which emphasis is placed on riding comfort, on the basis of information recognized from the lane regulating object provided on the road surface, and the short-term trajectory generating unit 73 (first trajectory generating unit) and the medium-term trajectory generating unit 72 (second trajectory generating unit) are capable of generating trajectories (the short-term trajectory St and medium-term trajectory Mt) in which emphasis is placed on adaptability and responsiveness, on the basis of information including an obstacle, a traffic participant, or the color of a traffic signal.

The lane regulating object includes the lane markings Lm and/or the lane departure prevention member such as the curbside Es, the guardrail Gr, or the like.

The external environment recognition unit 51 is capable of recognizing the lane shape of the lane L in which the host vehicle 10 travels from the lane markings Lm, or the lane departure prevention member such as the curbside Es, the guardrail Gr, or the like.

The present invention is not limited to the embodiment described above, and it goes without saying that various configurations could be adopted therein based on the descriptive content of the present specification.

The invention claimed is:

1. A vehicle control device that controls a vehicle configured to be driven automatically, comprising one or more processors that execute computer-executable instructions stored in a memory, wherein the one or more processors execute the computer-executable instruction to cause the vehicle control device to:

recognize a lane shape of a lane in which at least a host vehicle travels, from external environmental information that is detected by an external environment sensor configured to detect the external environmental information, and generate, at a generation cycle equal to or shorter than a first operation cycle, static external environment recognition information including lane shape information of the recognized lane shape and dynamic external environment recognition information including travel restraint source information including a traffic participant that restrains traveling of the host vehicle;

generate, using the external environment recognition information, a first trajectory in the first operation cycle; and generate, using the external environment recognition information, a second trajectory that is longer than the first trajectory in a second operation cycle that is longer than the first operation cycle; and for generating a newest one of the first trajectory, use the dynamic external environment recognition information generated at a most recent one of the generation cycle, and in a case that the static external environment recognition information the second operation cycle ago that is used in generating an immediate one of the second trajectory exists, refer to the static external recognition information the second operation cycle ago and the immediate one of the second trajectory.

2. The vehicle control device according to claim 1, wherein:

the external environment recognition information includes, in addition to the lane shape information, sign and marking information which is static external environment recognition information that regulates traveling of the host vehicle; and the one or more processors cause the vehicle control device to use the sign and marking information for generating the second trajectory, together with using the sign and marking information that is used the second operation cycle ago.

3. The vehicle control device according to claim 1, wherein the one or more processors cause the vehicle control device to: generate a third trajectory that is longer than the second trajectory, using the external environment recognition information in a third operation cycle that is longer than the second operation cycle;

when automated driving is started, simultaneously start generation of the first trajectory, the second trajectory and the third trajectory;

before the immediate one of the second trajectory is generated, generate the newest one of the first trajectory using the external environment recognition information generated at the most recent one of the generation cycle;

when the immediate one of the second trajectory has been generated, generate the newest one of the first trajectory using the immediate one of the second trajectory and the static external environment recognition information the second operation cycle ago including the lane shape that is used in generating the immediate one of the second trajectory; and when an immediate one of the third trajectory has been generated, generate the newest one of the first trajectory using the immediate one of the third trajectory and the external environment recognition information the third operation cycle ago including lane shape information that is used in generating the immediate one of the third trajectory.

4. The vehicle control device according to claim 3, wherein:

the external environment recognition information, in addition to the lane shape information, or the lane shape information and the sign and marking information, includes travel restraint source information that restrains traveling of the host vehicle; and the one or more processors cause the vehicle control device to use the travel restraint source information without the travel restraint source information being used by the third trajectory generating unit.

5. The vehicle control device according to claim 4, wherein the lane shape information is information recognized from a lane regulating object provided on a road surface, and the travel restraint source information is information including an obstacle, a traffic participant, or a color of a traffic signal.

6. The vehicle control device according to claim 5, wherein the lane regulating object includes a lane marking or a lane departure prevention member.

\* \* \* \* \*